(12) United States Patent
Denner et al.

(10) Patent No.: US 8,874,660 B2
(45) Date of Patent: *Oct. 28, 2014

(54) SYSTEM AND METHOD FOR CIRCUMVENTING INSTANT MESSAGING DO-NOT-DISTURB

(75) Inventors: Gary Denner, Co. Kildare (IE); Patrick Joseph O'Sullivan, Dublin (IE); Ruthie D. Lyle, Durham, NC (US); Mary Ellen Zurko, Groton, MA (US); Cynthia E. Barber-Mingo, Westford, MA (US)

(73) Assignee: Internatonal Business Machines Corporation, Armonk, NY (US)

( * ) Notice: Subject to any disclaimer, the term of this patent is extended or adjusted under 35 U.S.C. 154(b) by 964 days.

This patent is subject to a terminal disclaimer.

(21) Appl. No.: 11/859,941

(22) Filed: Sep. 24, 2007

(65) Prior Publication Data

US 2009/0083827 A1    Mar. 26, 2009

(51) Int. Cl.
*G06F 15/16* (2006.01)
*G06Q 10/10* (2012.01)

(52) U.S. Cl.
CPC .................................. *G06Q 10/107* (2013.01)
USPC ............................. 709/206; 709/200; 726/1

(58) Field of Classification Search
USPC ................ 709/200, 206, 207, 224; 726/1, 23
See application file for complete search history.

(56) References Cited

U.S. PATENT DOCUMENTS

| | | | |
|---|---|---|---|
| 5,828,742 A | 10/1998 | Khalid et al. | |
| 6,798,874 B1 | 9/2004 | Ohlinger et al. | |
| 7,606,862 B2 * | 10/2009 | Swearingen et al. | 709/206 |
| 8,285,796 B2 | 10/2012 | Denner et al. | |
| 2003/0014485 A1 * | 1/2003 | Banatwala | 709/204 |
| 2003/0204720 A1 * | 10/2003 | Schoen et al. | 713/153 |
| 2003/0229670 A1 | 12/2003 | Beyda | |
| 2004/0223599 A1 * | 11/2004 | Bear et al. | 379/207.02 |
| 2005/0132011 A1 | 6/2005 | Muller et al. | |
| 2005/0192039 A1 * | 9/2005 | Xue et al. | 455/517 |
| 2005/0203916 A1 * | 9/2005 | Hirose | 707/10 |
| 2005/0223075 A1 * | 10/2005 | Swearingen et al. | 709/207 |
| 2005/0249023 A1 | 11/2005 | Bodlaender | |
| 2006/0036688 A1 | 2/2006 | McMahan et al. | |
| 2006/0190547 A1 | 8/2006 | Bhogal et al. | |
| 2006/0242232 A1 * | 10/2006 | Murillo et al. | 709/204 |
| 2007/0223662 A1 | 9/2007 | Jain et al. | |
| 2008/0002820 A1 * | 1/2008 | Shtiegman et al. | 370/352 |
| 2008/0126481 A1 * | 5/2008 | Chakra et al. | 709/204 |
| 2008/0159490 A1 | 7/2008 | Gaudin et al. | |
| 2009/0083827 A1 | 3/2009 | Denner et al. | |
| 2009/0323907 A1 | 12/2009 | Gupta et al. | |
| 2010/0115033 A1 * | 5/2010 | Geffner et al. | 709/206 |
| 2010/0233995 A1 | 9/2010 | Gopalaswamy et al. | |

OTHER PUBLICATIONS

Avrahami, Daniel et al., "QnA: Augmenting an Instant Messaging Client to Balance User Responsiveness and Performance", Conference '04, ACM, 2004, pp. 1-4.

(Continued)

*Primary Examiner* — El Hadji Sall
(74) *Attorney, Agent, or Firm* — Holland & Knight LLP; Brian J. Colandreo, Esq.; Jeffrey T. Placker, Esq.

(57) ABSTRACT

A system and method for circumventing a do-not-disturb status of an instant messaging user including defining a policy of circumvention rights for circumventing do-not-disturb status in instant messaging. A do-not-disturb status of an instant messaging user is identified, and the do-not-disturb status of the instant messaging user is circumvented based upon the policy of circumvention rights.

20 Claims, 5 Drawing Sheets

(56) References Cited

OTHER PUBLICATIONS

Cutrell, Edward et al., "Notification, Disruption, and Memory: Effects of Messaging Interruptions on Memory and Performance", Microsoft Research, One Microsoft Way, Redmond, WA 98052 USA, pp. 1-7.

LeeTiernan, Scott et al., "Effective Notification Systems Depend on User Trust", Microsoft Research, One Microsoft Way, Redmond, WA 98052 USA, pp. 1-2.

http://www.microsoft.com/smallbusiness/resources/technology/communications/10_tips_for_using_instant_messaging_for_business.mspx, AMA/ePolicy Institute Research, pp. 1-19.

http://www.zdnetasia.com/news/security/0,39044215,39222828,00.htm, ZDNet Asia News, downloaded Feb. 2, 2012, pp. 1-6.

http://www.carrollcommunications.com/ipoffice/5donotdisturb.html, downloaded Feb. 2, 2012, pp. 1-2.

http://www.scrtc.com/donotdisturbservice.html, downloaded Apr. 27, 2012, pp. 1-2.

Oasis, Assertions and Protocol for the OASIS Security Assertion Markup Language (SAML) V1.1, Oasis Standard Sep. 2, 2003, pp. 1-53.

Mahy et al., "A Call Control and Multi-party Usage Framework for the session Initiation Protocol (SIP)," http://www.ietf.org/internet-drafts/draft-ietf-sipping-cc-framework-05.txt, downloaded Apr. 27, 2012 pp. 1-46.

http://www.ecma-international.org/publications/standards/Ecma-193.htm, downloaded on Feb. 2, 2012, pp. 1-2.

\* cited by examiner

SYSTEM AND METHOD FOR CIRCUMVENTING INSTANT MESSAGING DO-NOT-DISTURB

TECHNICAL FIELD

This disclosure relates to instant messaging and, more particularly, to systems and methods for circumventing a do not disturb status in Instant messaging systems.

BACKGROUND

Instant messaging provides real-time text based communication between two or more users interacting via computers or mobile devices. The more immediate and direct interaction provided by instant messaging often tends to more closely resemble a conversation, as compared to the more "letter like" format of email. The direct interaction between users can provide highly effective and convenient collaboration. For example, problems of unanswered emails and unreturned phone messages can be avoided.

While instant messaging can be a very useful tool for communication and collaboration, there are times when a user does not wish to be bothered or interrupted. This convenience is provided by a "do not disturb" ("DND") feature in the instant messaging application. The DND feature of an instant messaging system is typically enforced from the receivers' client by setting an associated status. Once this status is set it prevents other users from contacting the person until such time as the person returns to an active (or similar) status. However, situations can arise when it is deemed necessary to contact a person who is operating in DND status. Conventional instant messaging systems do not provide a DND override capability. Therefore, once DND status has been activated, the instant messaging user is unreachable by instant message until the user returns to active status.

SUMMARY OF THE DISCLOSURE

In a first implementation, a method includes defining a policy of circumvention rights for circumventing do-not-disturb (DND) status in instant messaging. A DND status of an instant messaging user is identified. The DND status of the instant messaging user is circumvented based upon the policy of circumvention rights.

One or more of the following features may be included. Defining the policy of circumvention rights may include assigning circumvention rights based on a hierarchal rights structure. The hierarchal rights structure may be based upon, at least in part, an organizational hierarchy. The organizational hierarchy may be defined, at least in part, by reference to a corporate directory. The policy of circumvention rights may assign circumvention rights to circumventing users having a higher hierarchal position than the instant messaging user.

The policy of circumvention rights may identify one or more specific circumventing users having circumvention rights.

According to another implementation, a computer program product resides on a computer readable medium having a plurality of instructions stored thereon. When executed by a processor, the instructions cause the processor to perform operations including defining a policy of circumvention rights for circumventing do-not-disturb (DND) status in instant messaging. A DND status of an instant messaging user is identified. The DND status of the instant messaging user is circumvented based upon the policy of circumvention rights.

One or more of the following features may be included. The instructions for defining the policy of circumvention rights may include instructions for assigning circumvention rights based on a hierarchal rights structure. The hierarchal rights structure may be based upon, at least in part, an organizational hierarchy. The organizational hierarchy may be defined, at least in part, by reference to a corporate directory. The policy of circumvention rights may assign circumvention rights to circumventing users having a higher hierarchal position than the instant messaging user.

The policy of circumvention rights may identify one or more specific circumventing users having circumvention rights.

The details of one or more implementations are set forth in the accompanying drawings and the description below. Other features and advantages will become apparent from the description, the drawings, and the claims.

DETAILED DESCRIPTION

System Overview

Figure 1:
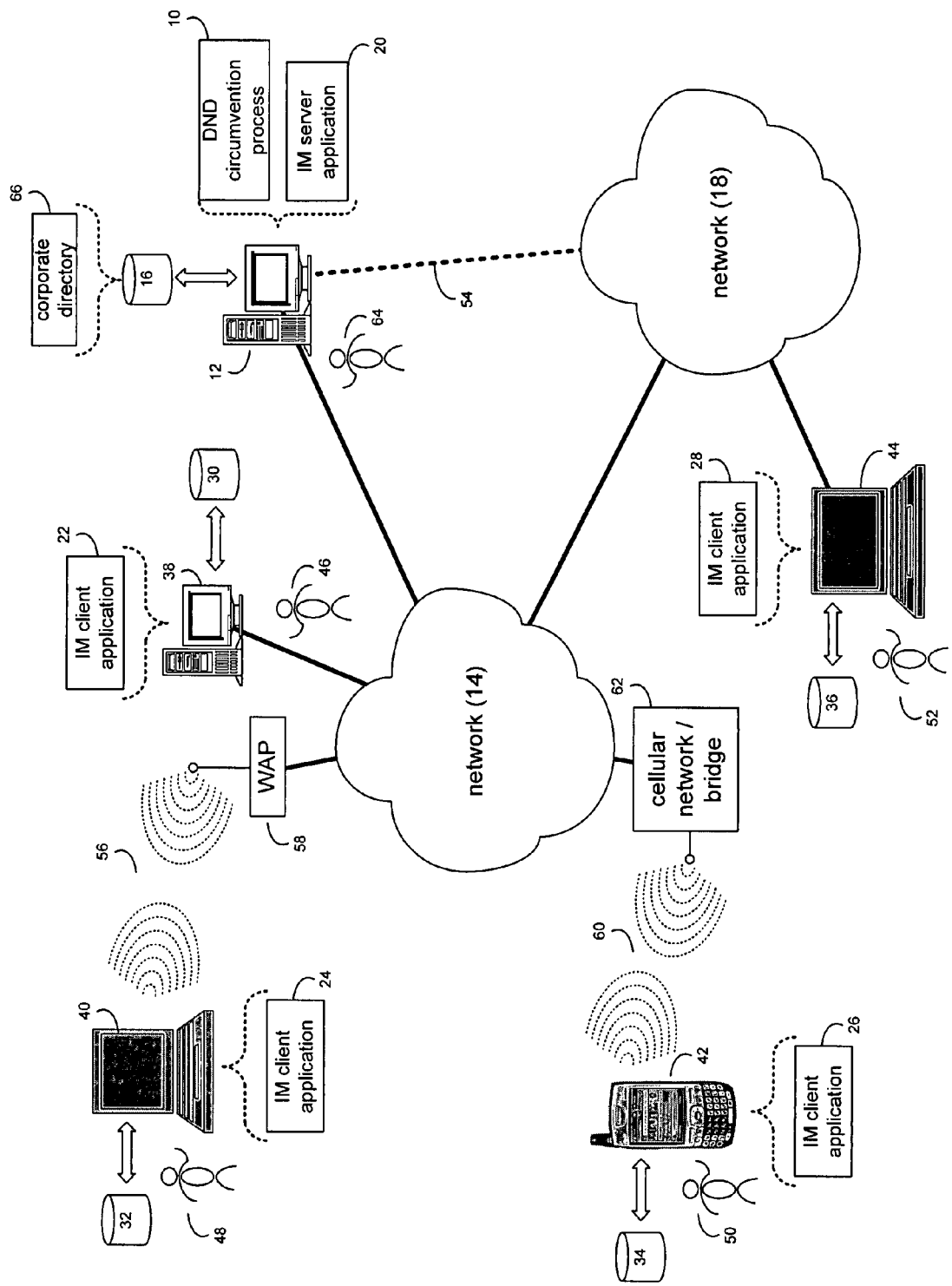
FIG. 1 diagrammatically depicts a DND circumvention process and an instant messaging application coupled to a distributed computing network.

Referring to FIG. 1, there is shown do not disturb ("DND") circumvention process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Alternatively, DND circumvention process 10 may reside on and be executed, in whole or in part, by a client electronic device, such as a personal computer, notebook computer, personal digital assistant, or the like.

As will be discussed below in greater detail, DND circumvention process 10 may allow a policy of circumvention rights for circumventing DND status in instant messaging to be defined. DND circumvention process 10 may allow a user to identify a DND status of an instant messaging user. Furthermore, DND circumvention process 10 may allow a user to circumvent the DND status of the instant messaging user based upon the policy of circumvention rights.

The instruction sets and subroutines of DND circumvention process 10, which may be stored on storage device 16 coupled to server computer 12, may be executed by one or more processors (not shown) and one or more memory architectures (not shown) incorporated into server computer 12.

Storage device 16 (i.e., a non-transitory computer readable medium) may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute an instant messaging server application, examples of which may include, but are not limited to IBM Lotus Sametime™, Microsoft Office Live Communications Server™, Jabber XCP™, and AOL Instant Messenger™. Instant messaging server application 20 may route instant messages to instant messaging client applications, e.g., instant messaging client applications 22, 24, 26, 28, examples of which may include but are not limited to IBM Lotus Sametime™, Microsoft Office Communicator™, Google Talk™, and AOL Instant Messenger™, for example. DND circumvention process 10 may be a stand alone application that interfaces with instant messaging server application 20 or an applet/application that is executed within instant messaging server application 20.

The instruction sets and subroutines of instant messaging server application 20, which may be stored on storage device 16 coupled to server computer 12 may be executed by one or more processors (not shown) and one or more memory architectures (not shown) incorporated into server computer 12.

As mentioned above, in addition/as an alternative to being a server-based application residing on server computer 12, the DND circumvention process may be a client-side application (not shown) residing on one or more client electronic device 38, 40, 42, 44 (e.g., stored on storage device 30, 32, 34, 36, respectively), and executed by a processor (not shown) and memory architecture (not shown) incorporated into the one or more client electronic devices. The client-side DND circumvention process may be a stand alone application that interfaces with an instant messaging client application (e.g., instant messaging client applications 22, 24, 26, 28), or may be an applet/application that is executed within an instant messaging client application. As such, the DND circumvention process may be a client-side application, a server-based application, or a hybrid client-side/server-based application, which may be executed, in whole or in part, by server computer 12, and/or one or more of client electronic device (e.g., client electronic devices 38, 40, 42, 44).

The instruction sets and subroutines of instant messaging client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 (i.e., non-transitory computer readable media) may include but are not limited to: hard disk drives; tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using instant messaging client applications 22, 24, 26, 28, users 46, 48, 50, 52 may access instant messaging server application 20 and may receive, create, and manage instant messages.

Users 46, 48, 50, 52 may access instant messaging server application 20 directly through the device on which the instant messaging client application (e.g., instant messaging client applications 22, 24, 26, 28) is executed, namely client electronic devices 38, 40, 42, 44, for example. Users 46, 48, 50, 52 may access instant messaging server application 20 directly through network 14 or through secondary network 18. Further, server computer 12 (i.e., the computer that executes instant messaging server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

Figure 2:
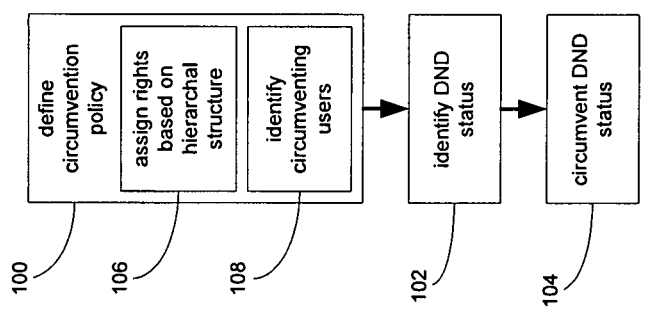
FIG. 2 is a flowchart of a process executed by the DND circumvention process of FIG. 1.

The DND Circumvention Process:

Referring also to FIG. 2, DND circumvention process 10 may allow a policy of circumvention rights for circumventing DND status in instant messaging to be defined 100. DND circumvention process 10 may allow a user to identify 102 a DND status of an instant messaging user. Furthermore, DND circumvention process 10 may allow a user to circumvent, 104 the DND status of the instant messaging user based upon the policy of circumvention rights.

For example, DND circumvention process 10 may allow user 64 to define 100 a policy of circumvention rights for circumventing DND status in instant messaging. User 64 may be, for example, a system administrator, or some other user having authority to define policies for an instant messaging system. To define 100 the policy of circumvention rights, user 64 may assign the circumvention rights based on various criteria used to determine who should be allowed to circumvent a DND status of a instant messaging user.

Figure 3:
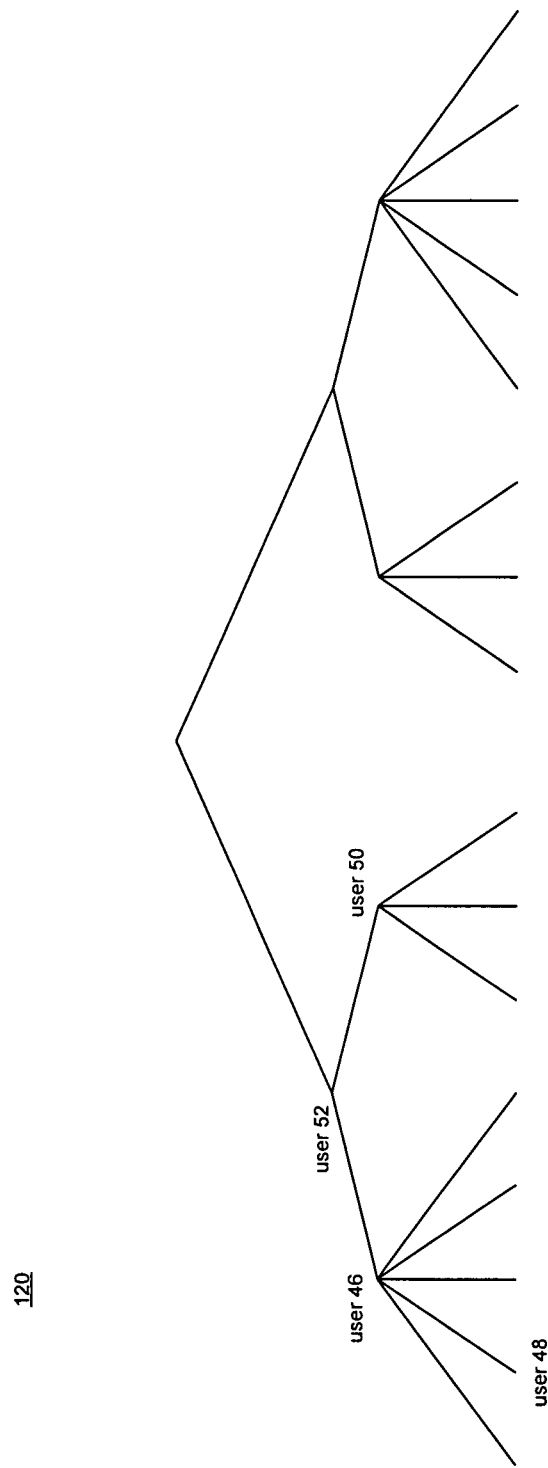
FIG. 3 diagrammatically depicts a hierarchal rights structure of users having access to the distributed computing network of FIG. 1.

In maintaining the applicability of DND status, there may be at least some restrictions upon who may be allowed to circumvent a DND status of an instant messaging user. The policy of circumvention rights may determine whether a given user can circumvent a DND status of an instant messaging user. Continuing with the above-stated example, DND circumvention process 10 may allow user 64 to define 100 the policy of circumvention right that may assign 106 circumvention rights based on a hierarchal rights structure. For example, referring also to FIG. 3, users 46, 48, 50, 52 may be members of an organization (e.g., a corporation) having a hierarchal structure. User 46 may have a higher relative hierarchal status relative to user 48 and an equal hierarchal status relative to user 50. User 52 may have a higher hierarchal status relative to users 46, 48, 50.

Consistent with a policy of circumvention rights based on a hierarchal rights structure, DND circumvention process 10 may assign 106 circumvention rights based on pure relative hierarchal status. In such a situation, any user having a higher relative hierarchal status may circumvent the DND status of any instant messaging user having a lower relative hierarchal status. Continuing with the above stated example, DND circumvention process 10 assigning 106 circumvention rights based on pure relative hierarchal status may allow users 46, 50, 52 to circumvent a DND status of user 48, and user 52 to circumvent a DND status of users 46, 50. Other limitations and variation may also/alternatively be implemented. For example, circumvention rights may require a distance of hierarchal separation. In such an example, user 46 directly above the user 48 may not be permitted to circumvent the DND status of user 48, immediately below user 46. User 52, residing two tiers above user 48 in the hierarchal rights structure, may circumvent the DND status of user 48. Other distances of hierarchal separation may be implemented.

According to another policy, circumvention rights may be limited to hierarchal status within a common chain of command. For example, in FIG. 3, user 50 may reside in a first chain of command (e.g., branch on a branched hierarchal structure), and user 48 may reside in a second chain of command. When circumvention rights are limited to hierarchal status within a common chain of command, user 50 may not circumvent the DND status of users 48, not withstanding the relatively higher hierarchal status of user 50. Various other policies of circumvention rights based upon, at least in part, hierarchal rights structure may also be established.

The hierarchal rights structure may be based upon, at least in part, an organizational hierarchy (e.g., of a corporation, government agency, or the like). For example, user 46 may be a manager, and may have the right to circumvent an instant messaging DND status user 48 overseen by user 46. Similarly, user 52 may be a department head, and may be assigned 106 circumvention rights for circumventing an instant messaging DND status of the various users within the department, e.g., users 46, 48, 50. The organizational hierarchy by which instant messaging DND circumvention rights are assigned 106 may be defined, at least in part, by reference to a corporate directory (e.g., corporate directory 66, residing on storage device 16 of server computer 12). Corporate directory 66 may include information regarding the organizational structure of a corporation. Users included in the organizational structure of the corporation may include an associated hierarchal status indicator (e.g., title, pay grade, seniority level) based upon which DND circumvention process 10 may assign 106 instant messaging DND circumvention rights. As such, DND circumvention process 10 may reference corporate directory 66 to assign 106 DND circumvention rights. Changes in hierarchal status may be reflected in corporate directory 66. Changes in the organization hierarchal status reflected in corporate directory 66 may be applied to circumvention rights assigned 106 by DND circumvention process 10.

As discussed above, DND circumvention rights may be assigned 106 on a strictly hierarchal basis. Additionally/alternatively other factors may also be included in the DND circumvention policy. For example, DND circumvention rights may only be assigned to individuals above a predetermined level. Continuing with the above-stated example, user 46 may be a manager, and may not be assigned DND circumvention rights. However, user 52 may be a department head may be assigned DND circumvention rights to circumvent a DND status of any instant messaging user in the department (e.g., users 46, 48, 50). Similarly, a department head of a first department may be assigned circumvention rights to circumvent a DND status of an instant messaging user in his department, but may not be assigned DND circumvention rights to circumvent a DND status of an instant messaging user in another department, regardless of relative hierarchal status. Various other polices of circumvention rights may be defined 100.

In addition to/as an alternative to assigning 106 DND circumvention rights based on hierarchal status, DND circumvention process 10 may identify 108 one or more specific users that may circumvent DND status of an instant messaging user. The specific users may be, for example, supervisors, system administrators (e.g., user 64), or the like that are considered "trusted users". The identified 108 circumventing users may have the right to circumvent DND status of all, or a portions, of instant messaging users.

Figure 4:
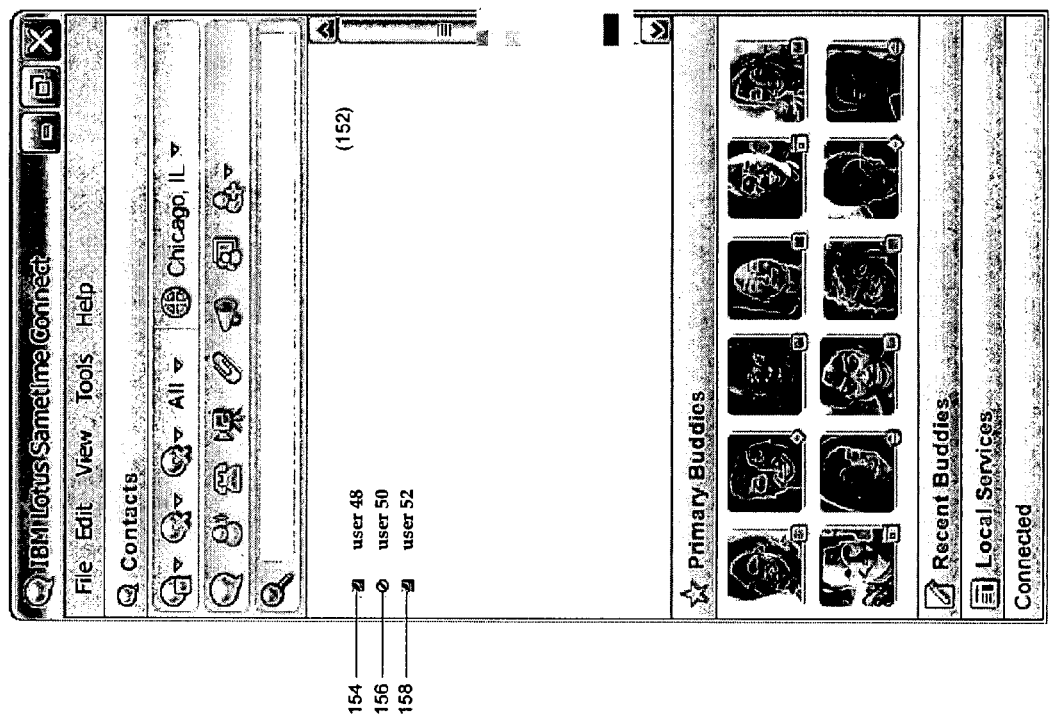
FIG. 4 is a diagrammatic view of an instant messaging user interface rendered by the DND circumvention process and/or the instant messaging application of FIG. 1.

DND circumventing process 10 may allow a user to identify 102 a DND status of an instant messaging user. For example, and referring also to FIG. 4, an instant messaging application (e.g., instant messaging client 22) and/or DND circumvention process 10 may render an instant messaging user interface 150. Instant messaging user interface 150 may include contacts list 152 that may allow user 46 to identify instant messaging contacts (e.g., user 48, 50, 52). Status icons (e.g., status icons 154, 156, 158) may be associated with each instant messaging contact (i.e., users 48, 50, 52, respectively), indicating the current status of respective users. Status icons 154, 158 may identify users 48, 52 as being available for instant message chats, and status icon 156 may identify 102 user 50 as being on DND status.

Figure 5:
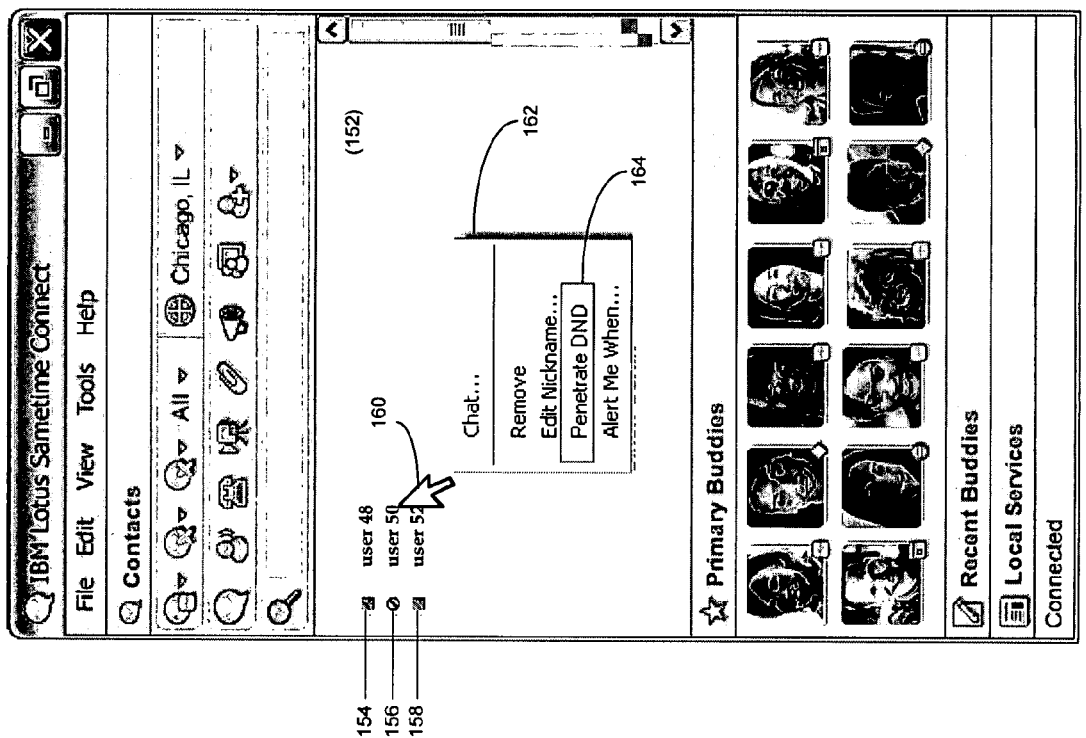
FIG. 5 is a diagrammatic view an instant messaging user interface rendered by the DND circumvention process and/or the instant messaging application of FIG. 1.

DND circumvention process 10 may allow a user to circumvent 104 the DND status of the instant messaging user based upon the policy of circumvention rights. With additional reference to FIG. 5, user 46 may have DND circumvention rights to circumvent 104 the DND status of user 50, e.g., based upon the policy of circumvention rights. User 46 may select user 50 in from contact list 152, e.g., using onscreen pointer 160 controlled by a pointing device (e.g., a mouse; not shown), and "right clicking" on user 50. "Right clicking" on user 50 may result in DND circumvention process 10 and/or instant messaging client application 22 rendering popup menu 162. Popup menu 162 may define one or more options including, for example, "Chat", "Remove", "Edit Nickname", "Penetrate DND", and "Notify Me When". User 46 may select "Penetrate DND", e.g., using onscreen pointer 160 controlled by the pointing device. By selecting "Penetrate DND", DND circumvention process 10 may allow user 46 to circumvent 104 the DND status of user 50.

Circumventing 104 the DND status of user 50 may allow user 46 to send an instant message directly to 50. Additionally/alternatively, DND circumvention process 10 may notify user 50 that user 46 is attempting to send an instant message. For example, DND circumvention process 10 may send a system notification to user 50 indicating that user 46 is attempting to instant message user 50. Various other notifications may be used to notify user 50 that user 46 intends to circumvent the DND status.

A number of implementations have been described. Nevertheless, it will be understood that various modifications may be made. Accordingly, other implementations are within the scope of the following claims.

What is claimed is:

1. A method comprising:
    defining a policy of circumvention rights for circumventing do-not-disturb (DND) status of a first instant messaging user, wherein the policy of circumvention rights comprises assigning circumvention rights based on a hierarchal rights structure of one or more users;
    identifying, by an instant messaging client associated with a second instant messaging user, a DND status of the first instant messaging user;
    notifying the first instant messaging user that the second instant messaging user intends to circumvent the DND status of the first instant messaging user; and
    circumventing the DND status of the first instant messaging user based upon the policy of circumvention rights;
    wherein the policy of circumvention rights for circumventing the DND status in instant messaging is based upon, at least in part, a distance of hierarchical separation.

2. The method of claim 1, wherein the hierarchal rights structure is based upon, at least in part, an organizational hierarchy.

3. The method of claim 2, wherein the policy of circumvention rights assigns circumvention rights to circumventing users having a higher hierarchal position than the first instant messaging user.

4. The method of claim 2, wherein the organizational hierarchy is defined, at least in part, by reference to a corporate directory.

5. The method of claim 1, wherein the policy of circumvention rights identifies one or more specific circumventing users having circumvention rights.

6. A computer program product residing on a non-transitory computer readable medium having a plurality of instructions stored thereon which, when executed by a processor, cause the processor to perform operations comprising:
    defining a policy of circumvention rights for circumventing do-not-disturb (DND) status of a first instant messaging user, wherein the policy of circumvention rights comprises assigning circumvention rights based on a hierarchal rights structure of one or more users;
    identifying, by an instant messaging client associated with a second instant messaging user, a DND status of the first instant messaging user;
    notifying the first instant messaging user that the second instant messaging user intends to circumvent the DND status of the first instant messaging user; and
    circumventing the DND status of the first instant messaging user based upon the policy of circumvention rights;
    wherein the policy of circumvention rights for circumventing the DND status in instant messaging is based upon, at least in part, a distance of hierarchical separation.

7. The computer program product of claim 6, wherein the hierarchal rights structure is based upon, at least in part, an organizational hierarchy.

8. The computer program product of claim 7, wherein the policy of circumvention rights assigns circumvention rights to circumventing users having a higher hierarchal position than the first instant messaging user.

9. The computer program product of claim 7, wherein the organizational hierarchy is defined, at least in part, by reference to a corporate directory.

10. The computer program product of claim 6, wherein the policy of circumvention rights identifies one or more specific circumventing users having circumvention rights.

11. The method of claim 1, wherein the policy of circumvention rights for circumventing the DND status in instant messaging is based upon, at least in part, a number of tiers in the hierarchical rights structure.

12. The method of claim 4, wherein one or more users listed in the corporate directory are associated with one or more hierarchical status indicators.

13. The method of claim 1, further comprising: rendering a popup menu including an option that, if selected, is configured to circumvent the DND status of the first instant message user.

14. The method of claim 13, wherein the popup menu is accessible from a user interface including a contact list, the contact list identifying the first instant message user.

15. The computer program product of claim 6, wherein the policy of circumvention rights for circumventing the DND status in instant messaging is based upon, at least in part, a number of tiers in the hierarchical rights structure.

16. The computer program product of claim 9, wherein one or more users listed in the corporate directory are associated with one or more hierarchical status indicators.

17. The computer program product of claim 6, further comprising instructions for: rendering a popup menu including an option that, if selected, is configured to circumvent the DND status of the first instant message user.

18. The method of claim 17, wherein the popup menu is accessible from a user interface including a contact list, the contact list identifying the first instant message user.

19. The method of claim 12 wherein the hierarchical status indicator includes one or more of title, pay grade, and seniority level.

20. The computer program product of claim 16 wherein the hierarchical status indicator includes one or more of title, pay grade, and seniority level.

* * * * *